United States Patent
Coates et al.

(10) Patent No.: US 6,181,642 B1
(45) Date of Patent: *Jan. 30, 2001

(54) APPARATUS AND METHOD FOR BOREHOLE SEISMIC EXPLORATION

(75) Inventors: Richard Timothy Coates, Bethel, CT (US); Philip Andrew Felton Christie, Fen Drayton (GB)

(73) Assignee: Schlumberger Technology Corporation, Sugar Land, TX (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/947,660

(22) Filed: Oct. 9, 1997

(30) Foreign Application Priority Data

Oct. 11, 1996 (GB) .................................. 9621236

(51) Int. Cl.[7] .................................................. G01V 1/00
(52) U.S. Cl. .............................. 367/25; 367/35; 181/105
(58) Field of Search .................. 367/20, 35, 86, 367/32, 189, 25; 181/102, 121, 106, 104, 105; 340/15.5

(56) References Cited

U.S. PATENT DOCUMENTS

| | | |
|---|---|---|
| 3,526,874 | 9/1970 | Schwartz . |
| 4,131,875 * | 12/1978 | Ingram ............................... 340/15.5 |
| 4,283,953 * | 8/1981 | Plona ..................................... 73/589 |
| 4,365,322 | 12/1982 | Widrow . |
| 4,382,290 * | 5/1983 | Havira .................................. 367/35 |
| 4,685,092 * | 8/1987 | Dumont ................................ 367/35 |
| 4,711,303 | 12/1987 | Koeling et al. . |
| 4,783,771 | 11/1988 | Paulsson . |
| 4,789,968 | 12/1988 | Rice . |

(List continued on next page.)

FOREIGN PATENT DOCUMENTS

| | | |
|---|---|---|
| 0 224 285 A2 | 6/1987 | (EP) . |
| 0 388 316 A2 | 9/1990 | (EP) . |
| 1 193 381 | 5/1970 | (GB) . |
| 2 125 166 | 2/1984 | (GB) . |
| 2 154 320 | 9/1985 | (GB) . |
| 2 200 451 | 8/1988 | (GB) . |
| 2 300 048 | 10/1996 | (GB) . |
| 2318185 * | 4/1998 | (GB) ............................. G01V/1/40 |

OTHER PUBLICATIONS

Rice, J. A. Method and system for seismic exploration employing a dual–dipole hydrophone streamer Abstract of US Patent No. 4,789,968.

Horowicz, L. Environmental Correction in Borehole Seismics Document believed to be dated prior to Oct. 1997.

Krohn, C. E., et al Comparisons of Downhole Geophones and Hydrophones Geophysics, Jun. 1992, vol. 57, No. 6, pp. 841–847.

* cited by examiner

Primary Examiner—Christine K. Oda
Assistant Examiner—Anthony Jolly
(74) Attorney, Agent, or Firm—William L. Wang; Brigitte L. Jeffery (57) ABSTRACT

Methods and apparatus are described for the seismic exploration of strata adjacent to a borehole, wherein an arrangement of geophones is lowered into the borehole and clamped to the wall. The geophones are clamped at essentially equal angular distances along the circumference of the borehole. A plurality of such arrangements can be positioned along the longitudinal axis of the borehole. By combining the outputs of the geophones noise signals generated by symmetric guided waves are attenuated. The arrangement can be used for cross-well seismic acquisition and in combination with seismic sources and/or attenuator so as to form an single-unit exploration tool for borehole seismics.

18 Claims, 5 Drawing Sheets

U.S. PATENT DOCUMENTS

| | | | |
|---|---|---|---|
| 4,791,619 | * 12/1988 | Liu | 367/35 |
| 4,802,145 | 1/1989 | Mount, II . | |
| 4,837,753 | * 6/1989 | Morris et al. | 367/69 |
| 4,873,675 | 10/1989 | Barr, Jr. et al. . | |
| 4,874,061 | 10/1989 | Cole . | |
| 4,916,648 | * 4/1990 | Gard | 367/35 |
| 4,962,489 | * 10/1990 | Medlin et al. | 367/32 |
| 4,987,969 | * 1/1991 | Boyle et al. | 181/102 |
| 5,005,159 | * 4/1991 | Krohn | 367/57 |
| 5,146,050 | 9/1992 | Strozeski et al. . | |
| 5,200,581 | * 4/1993 | Boyle et al. | 181/102 |
| 5,212,354 | 5/1993 | Miller et al. . | |
| 5,214,614 | 5/1993 | Baule . | |
| 5,521,337 | 5/1996 | Chen et al. . | |

APPARATUS AND METHOD FOR BOREHOLE SEISMIC EXPLORATION

BACKGROUND OF THE INVENTION

1. Field of the Invention

The present invention relates to an acquisition method and apparatus for seismic exploration. More specifically, the invention relates to a data acquisition method and apparatus for downhole seismics investigating the strata surrounding a borehole.

2. Description of the Related Art

Seismic exploration methods are well established in the art. They are employed to obtain a broad general information about subsurface strata. The known techniques are generally implemented by utilizing an explosive or vibratory source and seismic sensors which are disposed at multiple locations on the surface of the earth or which are towed by a exploration vessel through the water.

More recently, it has be recognized that a combination of seismic exploration methods with selected borehole, measurements may be utilized to obtain more detailed information about subsurface formations and hydrocarbon reservoirs. These methods are often referred to as borehole or downhole seismics, particularly single well seismics and cross-well seismics. They involve the placement of seismic sensors in the borehole, which record the seismic wave field due to a seismic source at another location in the same borehole or in another borehole.

In most applications of downhole seismics, the seismic wave field of greatest interest is the wave field propagating in the rock, i.e., the wave field which would be present in the rock at the sensor location if the borehole itself were absent. Thus, parts of the seismic wave field which are only due to the presence of the borehole itself are usually regarded as noise. In particular, it is desirable to design downhole receiver tools so as to minimize their sensitivity to energy propagating primarily within the fluid-filled borehole. Examples of such waves are known tube waves or low frequency Stoneley waves.

It had been found that the use of hydrophones mounted in elongated cables, so-called "streamers", placed downhole in a fluid-filled well, are particularly responsive to tube waves. In those cases the detected seismic signal is dominated by the tube wave energy, obscuring arrivals representing seismic waves that have undergone reflection from a reflector in the subterranean formation.

A method for attenuating the tube wave signal in a streamer configuration is known from U.S. Pat. No. 4,789, 968. The streamer houses pairs of orthogonally mounted hydrophones, thereby permitting the selective detection of waves incident from any direction of interest.

In other methods the hydrophones have been replaced by downhole wall-locking geophones. These geophones are positioned in direct contact to the borehole wall, typically by elements that may be extended outwardly to the borehole wall from a sonde suspended in the borehole fluid at the end of a wireline. A typical example of this technique is described in the United States patent U.S. Pat. No. 5,212, 354.

It has been further proposed in U.S. Pat. No. 4,078,223 to mount geophones in a seismic detector cable and oriented in different directions perpendicular to the cable's longitudinal axis. In operation, the geophones that happen to be vertically oriented at any given moment is sensitive to vertical waves. Those geophones which happen to be horizontally oriented at a given moment are disabled by gravity operated switches or the like.

In view of the known arrangements and methods for detecting seismic signals with a downhole receiver, it is the object of the invention to provide a receiver arrangement that is sensitive to the wave field of interest but reduces the noise caused by symmetric waves guided by the borehole.

SUMMARY OF THE INVENTION

The invention utilizes the different characteristics of motion induced by the tube wave or any other symmetrically guided wave and by waves incident from outside the borehole. The motion induced by the tube wave at points on opposite sides of the borehole is of equal magnitude but opposite direction. However, the motion induced by a wave incident from outside the borehole at opposite sides of the borehole is of essentially equal magnitude and equal direction.

The guided wave can be attenuated by arranging at least two geophones at separate positions along the perimeter of a cross-section essentially perpendicular to the axis of the wellbore and combining their respective output signals.

By introducing cylindrical coordinates $(r, \phi, z)$ with z denoting the position ("depth") along the longitudinal axis of the borehole, r the distance from this axis, i.e., the radius of the borehole, and $\phi$ the polar angle in a plane perpendicular to the axis of the borehole, an alternative description of the present invention can be given. The invention can then be characterized as an arrangement of at least two geophones positioned at approximately the same position z at different polar angles $\phi$. The radial positions of the detectors are defined by the diameter of the borehole at z.

It is preferred to restrict the difference in the axial position ($\Delta z$) to values smaller than the wavelength of the tube wave. If the difference is of the order of the wavelength or larger, it is necessary to introduce additional corrections to the signals as measured by the geophones in order to suppress the noise due to the tube wave. In terms of absolute values, the difference preferably should not exceed 1 m or even more preferably 0.5 m. However larger differences may be corrected using programmed microprocessor devices or computers which are capable of reconstructing the diametrically opposed wave field from individually positioned geophones.

The term "geophone" as used herein includes directionally selective or anisotropic transducers which convert the seismic wave into a signal suitable for further processing, e.g., transducers based on the principle of a moving coil or solid state or other accelerometer. Also included are transducers which are sensitive to two or three independent directions in space, such as two-component (2C-) or three-component (3C-) geophones.

In a preferred embodiment of the invention, the geophone arrangement is designed with a radial symmetry, thus facilitating noise cancellation procedure. In a variant of this embodiment, noise cancellation can be achieved by a suitably connecting the output lines of the respective geophones so as to produce a difference signal in which the tube wave contribution is reduced.

In an even more preferred embodiment of the invention the geophones are arranged as two pairs of geophones with the geophones of each pair separated by approximately 180 degrees and one pair positioned perpendicularly to the other. Each geophone of this arrangement is radially oriented in the same direction. Employing this arrangement, seismic signals can be detected irrespective of their angle of incidence. It is noteworthy that such an arrangement is simultaneously applicable for vertically oriented boreholes and for horizontal boreholes without further modifications.

The outputs of the two paired geophones positioned on opposite sides of the borehole are combined so as to minimize the sensitivity with respect to the tube waves while enhancing the sensitivity with regard to the seismic signals from the formation. In principle it suffice to subtract/add both outputs to achieve this result.

It will be appreciated that the above described arrangement consisting of two pairs of one-component geophones each oriented in radial direction covers all possible angles of incidence. Under specific circumstances, however, it may be desirable to give the arrangement a preferential direction, in which case a single pair of one-component geophones could be deployed provided the means to control the angular position of the pair inside the wellbore.

The number of geophone in the arrangement can be reduced by making use of two- or three component geophones oriented not only in radial direction but also in one or two perpendicular directions. A single pair of 2-C geophones, accordingly oriented, is in principle capable of detecting the complete seismic waves incident from any radial direction. With a pair of 3-C geophones, it is possible to detect the complete three-dimensional wave field of the body wave, though the component of the wave field axial with regard to the borehole is contaminated by the tube wave.

In another aspect of the invention a plurality of the above described arrangement of geophones are incorporated into one downhole tool which, in operation, is lowered into the borehole. The distance between single arrangements may vary from 0.5 m to 20 m depending on the desired resolution of the seismic measurement. The number of arrangements may vary depending on the specific circumstances of the acquisition. Also, these circumstances may require that the plurality of arrangements comprises different types of geophone arrangements at different locations on the tool.

In further embodiment, the arrangement of geophones is combined with attenuators for acoustic waves so as to further increase its efficiency in reducing the noise level of the signal.

In yet another embodiment, the arrangement of geophones is combined with a source for acoustic signals so as to form a complete tool for borehole logging or seismic measurements. Preferably, such a combination is equipped with attenuators to suppress the direct signal from the source and its reflections from the end of the borehole, all of which may interfere with the seismic signals. In other embodiments source and receiver arrangements are separated and disposed in different boreholes.

A further embodiment of the invention comprises one or a plurality of geophone arrangements as described above in combination with either wave attenuating equipment or with a seismic source, or both.

These and other features of the invention, preferred embodiments and variants thereof, possible applications and advantages will become appreciated and understood by those skilled in the art from the detailed description and drawings following hereinafter.

DESCRIPTION OF THE PREFERRED EMBODIMENTS

Figure 1A:
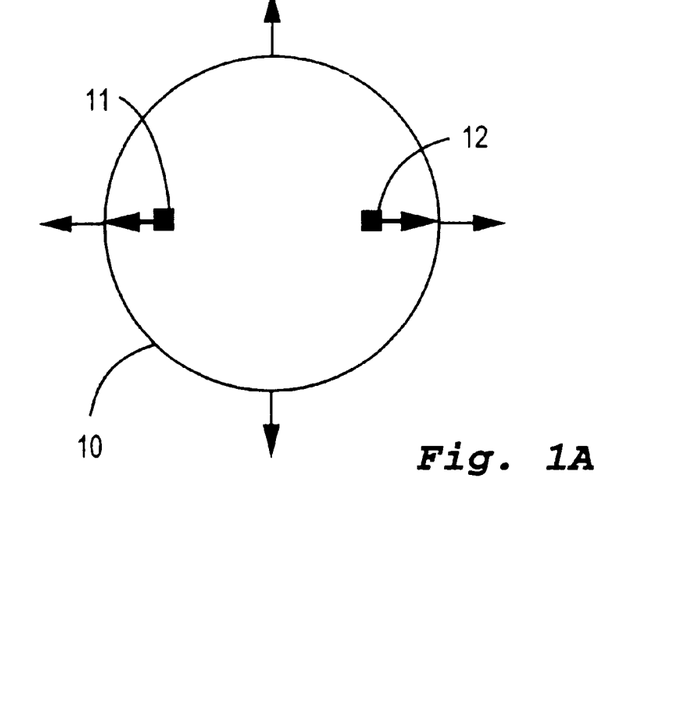
FIGS. 1A, 1B show a schematic representation of the motion of the borehole wall induced by tube waves (1A) and a wave incident from outside the borehole (1B).
Figure 1B:
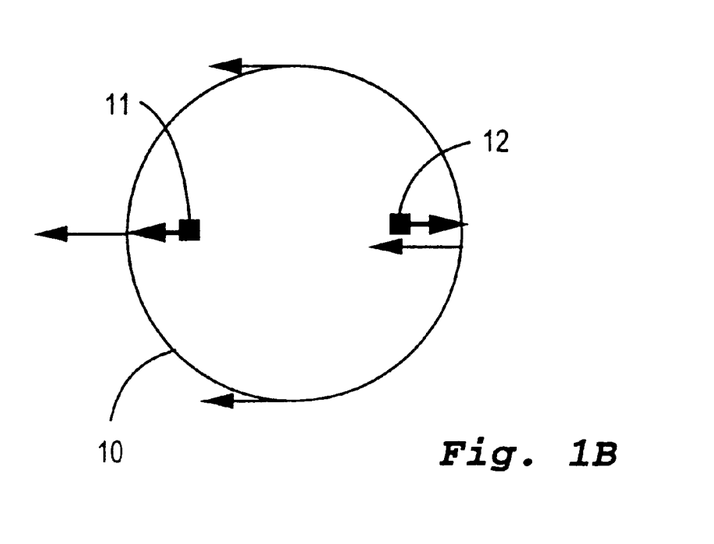

Referring to FIGS. 1A and 1B, the principle of the present invention is illustrated. Two 1C geophones 11, 12 oriented as indicated by the attached arrows are positioned at the perimeter of the borehole 10. The motion of the surrounding formation induced by a tube wave (FIG. 1A) and by a body wave (FIG. 1B), respectively, is indicated by a set of four arrows. The opposite radial orientation of the geophones results in a output signals (traces) which are schematically depicted in FIG. 1C.

The body wave arriving first is recorded by the geophones 11, 12 with ideally equal amplitude and a 180 degrees phase difference. The tube wave however is recorded with equal amplitude and phase.

Figure 1C:
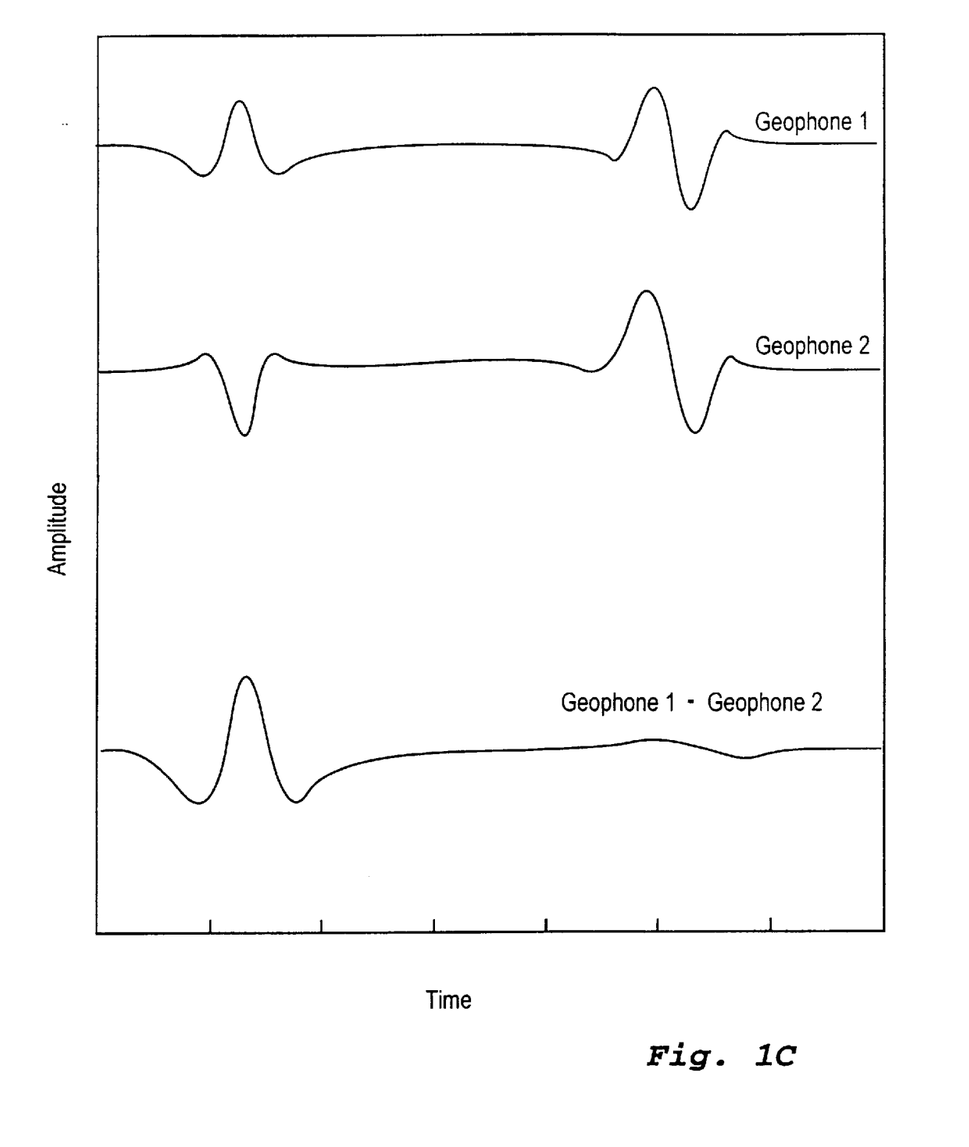
FIG. 1C displays a schematic representation of the motion recorded by each geophone of a pair (top two traces) and the difference of the outputs from both geophones (bottom trace).

The difference of both trace, i.e., the third trace of FIG. 1C, illustrates the constructive interference of the signal representing the body wave and a cancellation of the signals.

Figure 2:
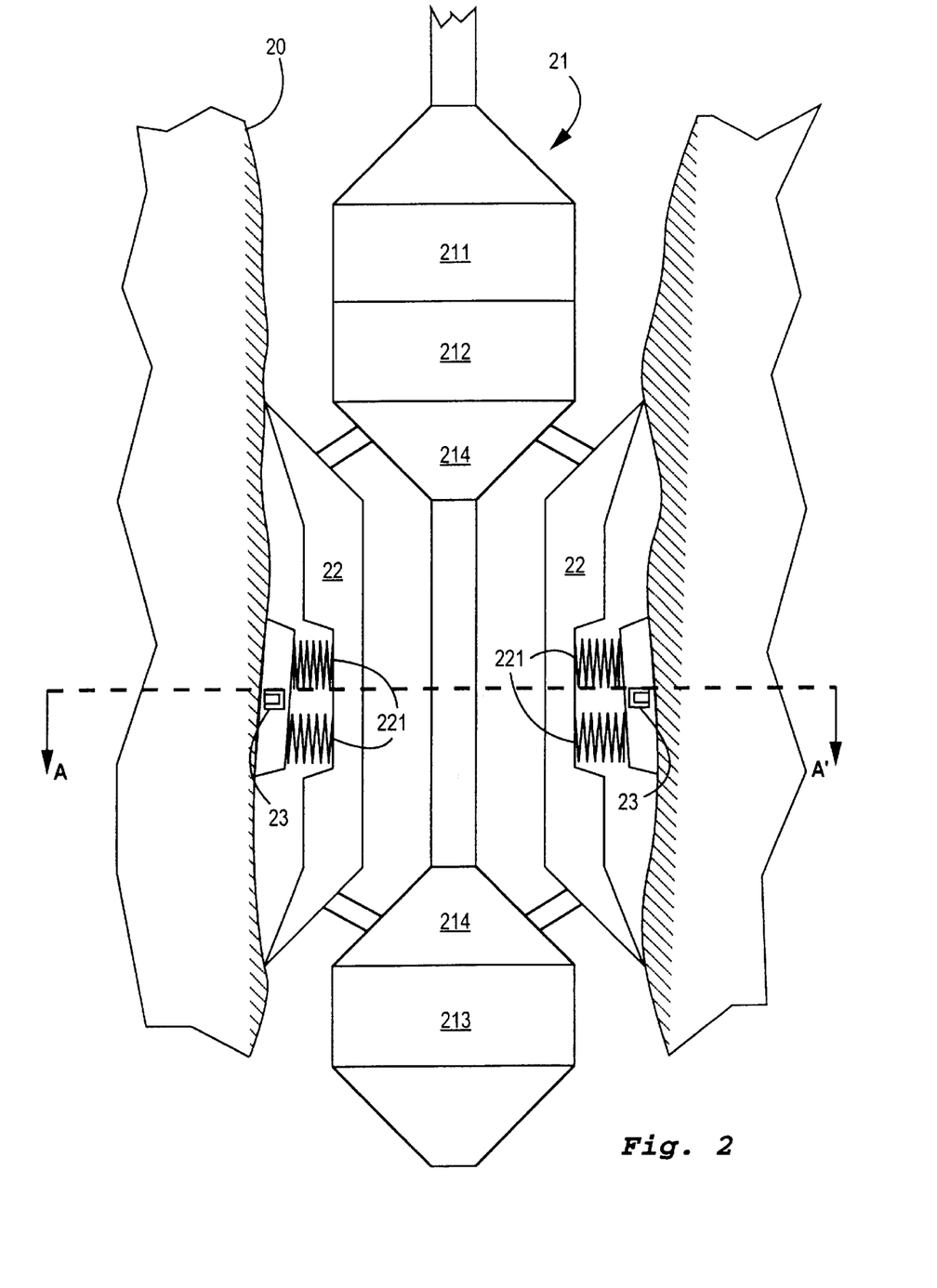
FIGS. 2 and 3 show the longitudinal and the cross-section, respectively, of an embodiment of the invention.
Figure 3:
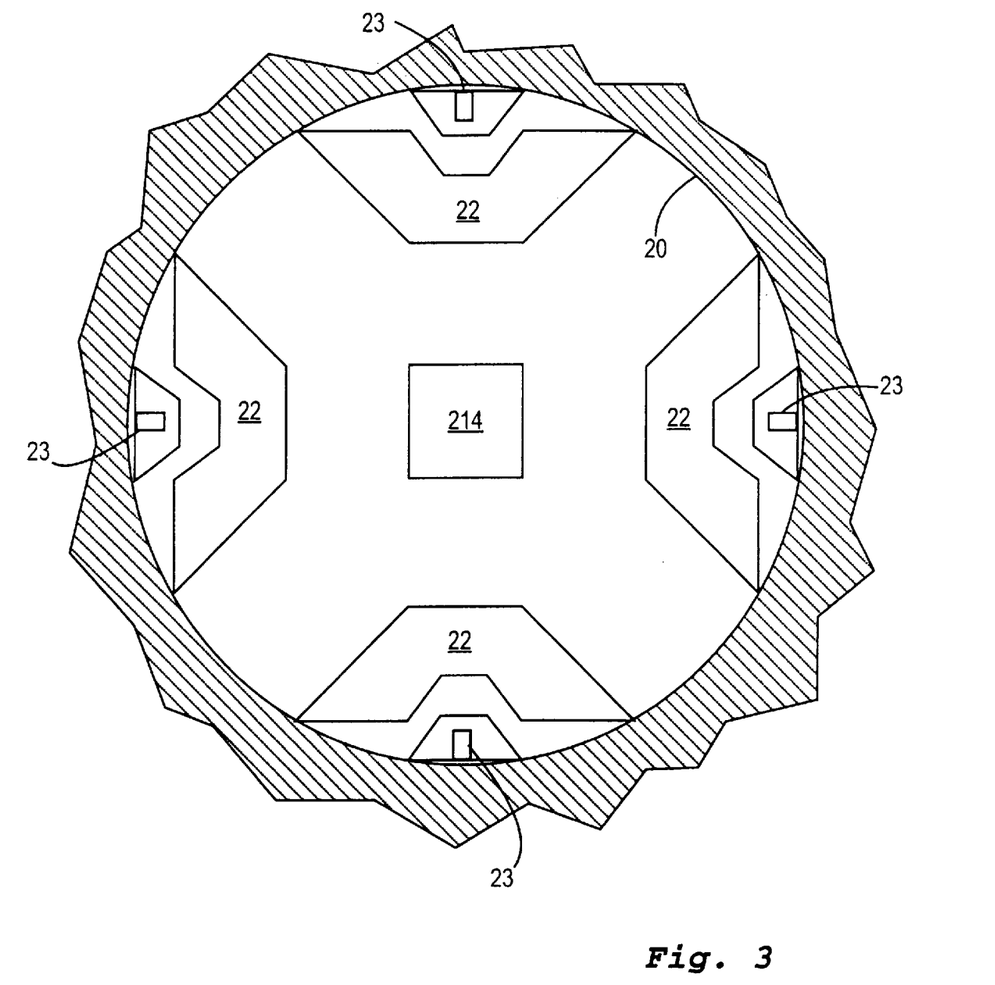

Referring now to FIGS. 2 and 3, an example of the invention is shown comprising a set of four 1C (one component) geophones. The downhole tool comprises a main body 21, which is to be suspended on a standard wireline into the borehole 20. The main body includes a telemetry section 211 for transmitting and receiving signals to and from the surface. It further comprises a tool control section 212 which controls the operation of the tool. The main body further includes an acquisition section 213 which receives, processes and transmits the data recorded by the geophones. Also part of the main body 21 is an anchoring section 214 which comprises hydraulically and electromagnetically operated clamping devices 22. Mounted on the clamping bodies 22 are holders carrying geophones 23. The holders are flexible coupled to the clamping body by spring means 221. Each geophone is integrated into a two tier gimbal system (not shown) to ensure its correct radial orientation.

FIG. 3 shows a cross-section along line A–A' of FIG. 2A. The same numerals are used for denoting elements appearing in both figures.

In operation, the tool 21 is lowered into the borehole 20 and at the predetermined depth the anchoring section releases the clamping bodies 22, which are firmly pressed against the side-walls of the borehole. Then the geophones 23 are released. The springs 221 firmly press the geophone holder against the side-wall thus resulting in a good mechanical coupling between the side-wall and the geophone.

As one pair of 1C-geophones is insensitive for signals incident from a angle of 90 degrees to its orientation, the combined signals of both pairs of geophones are summed to capture reflection signals independently from their direction of propagation.

The described example can be modified by replacing the 1C geophones 22 by 2C or 3C geophones, in which case one pair of geophones suffice to detect seismic reflections from all angles of incident.

Instead of using pairwise arrangements of geophones, an alternative arrangement in accordance with the invention may include an odd number of geophones. In such an arrangement comprising for example three geophones, the geophones can be place at 0, 120, and 240 degrees or any other three polar angles as deemed to be preferable regards design and static considerations.

The latter examples however require a more complex algorithm to combine the output signals single geophones so as to derive a measure representing the amplitude of an incident seismic wave. In further examples where sufficient processing capability is available, the gimbal system on which the geophones are mounted in the example described hereinafter may include a suitable orientation sensing device. Such devices can be selected from a variety of commercially available types, e.g. a gyrocompass, which all are capable of generating orientation information so as to correct for deviations in the orientation of the geophones.

Figure 4:
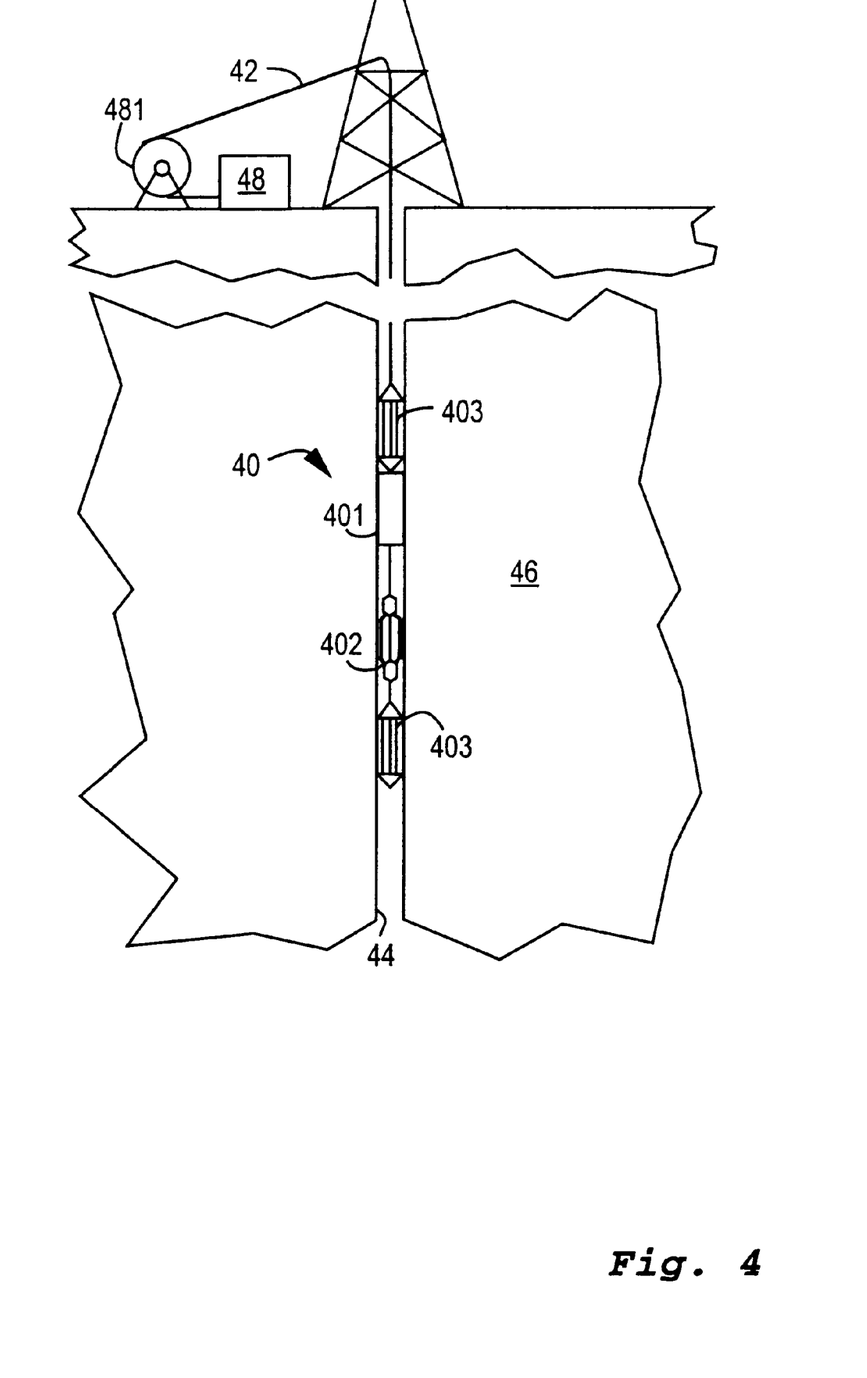
FIG. 4 shows an arrangement comprising a downhole seismic source, wave attenuators, and a detector arrangement in accordance with an embodiment of the invention.

FIG. 4 shows a schematic view of a borehole acoustic reflection imaging system according to one embodiment of the present invention. A sonic reflection imaging tool 40 is shown lowered on an armored multi-conductor cable 42 into a borehole 44, which can be cased or uncased, to make sonic measurements for imaging of the subsurface formation 46. The tool 40 is provided with a transmitter array 401 and a receiver array 402.

Whereas the receiver array is formed by one or more of the above described circumferentially arranged geophones, the transmitter or source array may comprise one or more known piezoelectric monopole source elements. In order for waves to penetrate deeper into the formation, a high power transmitter is necessary to overcome the loss generated by the medium as well as the amplitude drop with distance due to the geometrical spreading. With the space and voltage limitations present in a borehole tool, it is difficult to realize a single high power transmitter with limited tool space. Therefore, the solution can be to use an array of sources.

The potential problem with a longer sources or arrays is that the radiation beam pattern may change to undesired directions or limit the deployment of the receiver positions. A steerable array source can overcome this problem. The coherent wave front generated by the source array can be steered if one consecutively delays the firing of each element. The steering angle will depend on the amount of the delay to each source element. For example in water a thirty degrees steering away from the normal of the array will typically require a fifty microsecond delay to each array element spaced at 3.5 inches apart from center to center. This can be achieved either by having the same power amplifier and connect a time delay device to each source element or by using several power amplifiers and each having its independent timing control. Further details of known sources are also described in the U.S. Pat. Nos. 4,783,771 and 4,874,061.

One or more tube wave attenuators 403 are provided at both ends of the transmitter/receiver array section to reduce interfering effects of reflected tube waves in the borehole. One form of attenuator which has been proposed for use in borehole seismic systems is one or more inflatable bladders which are positioned in the borehole such as is described in U.S. Pat. No. 4,858,718 or U.S. Pat. No. 5,005,666. The bladders are inflated with gas to fill the borehole and provide acoustic isolation between the source and receiver. The bladders are provided with a supply of pressurized gas for inflation. This supply can be a container located downhole or a supply line from the surface. In either case, some control mechanism is required to allow inflation and deflation of the bladder for the desired depth of measurement. The bladder serves to reflect rather than dissipate the tube wave energy.

An alternative form of tube wave attenuator is disclosed in S T Chen, "A Single-Well Profiling Tool and Tube Wave Suppression" Expanded Abstract, SEG, 13–16, 1993 and in W T Balogh, "The Borehole Tubewave Damper Probe" Expanded Abstract, SEG, 159–162, 1992, which describe a probe which uses a Helmholtz resonator of high compliance to approximate a high-pass filter of borehole acoustic disturbances which pass the probe. The high compliance results from a gas-filled bladder which fills partially the Helmholtz resonator which comprises a cylindrical steel shell. The bladder is inflated at the surface to a pressure slightly below the ambient hydrostatic pressure in the borehole at the depth of interest and is then lowered into the well for use. This probe is a tube wave reflector and the operating depth depends on the precharge pressure of the bladder.

A still further approach to the problem of tube wave attenuation is proposed in L D Pham, C E Krohn, T J Murray and S T Chen, "A Tube Wave Suppression Device for CrossWell Applications" Expanded Abstract, SEG, 17–20, 1993. This document describes the use of a cylindrical porous but impermeable body between the source and receivers. Material which is proposed for such use is a material called "syntactic foam". UK Patent Application GB 2253054 describes the use of cork, an absorptive, compressible material, in the form of disks and balls as an attenuator. The effectiveness of both cork and syntactic foam is depth dependent.

Yet another alternative type of attenuator, suitable for the purpose of the present invention, comprises a body formed from a permeable material having a rigid matrix which can be saturated with fluid. The permeable material is selected so as to allow coupling of tube waves into slow waves in the attenuator. These slow waves are highly attenuated. In order for this coupling to be effective, it is necessary that the material be permeable, i.e., have a connected porous structure, and have a substantially rigid matrix material. Consequently, the material should be substantially self-supporting. A suitable material is permeable rock or a synthetic rock-like material, e.g. a sintered granular material.

The tool 40 is adapted for movement up and down borehole 44, and as the tool 40 is moved, the transmitter array 401 periodically generates a sonic signal. The generated sonic signal travels through the borehole and/or through the formation where it is reflected by underground structures, and the receivers in the receiver array 402 typically detect some energy which results from the generated signal. The mechanism for moving the tool 40 in the borehole includes the cable 42 which extends to a sheave wheel at the surface of the formation, and then to a suitable drum and winch mechanism 481 which raises and lowers the tool 10 in the borehole as desired. Electrical connection between transmitter array 401 and receiver array 402 on the one hand, and the surface equipment on the other hand, is made through a multi-element slipring and brush contact assembly as known in the art associated with the drum and winch mechanism 481. A unit 48 contains tool control and pre-processing circuits which send electrical signals to the tool 40 and receive other electrical signals (sonic logs) therefrom via cable 42 and the contact assembly. The unit 48 cooperates with a depth recorder which derives depth level signals from a depth measuring wheel so as to associate the signals from receiver array 402 with respective depth levels in borehole 44. The outputs of the receiver array 402, after optional pre-processing in unit 48, are sent to a signal storage, which can also receive signals from or through depth recorder so as to associate sonic receiver outputs with respective depth levels in the borehole 44. The signal storage can store the outputs of the receiver array 402 in the form of digital sonic log measurements. It can comprise a magnetic storage device such as a disk or tape, and/or other storage media such as semiconductor or equivalent memory circuits. The digital data can then be processed to provide an image of the underground formation surrounding the borehole. Kirchhoff-type migration of the data, such as is commonly used in seismic processing, is used to derive an image of the reflecting structures around the borehole.

It now will be recognized that new and improved methods and apparatus have been disclosed which meet all the objectives and have all the features and advantages of the present invention. Since certain changes or modifications may be made in the disclosed embodiments without departing from the inventive concepts involved, it is the aim of the appended claims to cover all such changes and modifications falling within the true scope of the present invention.

We claim:

1. An apparatus for making borehole seismic measurements comprising:
   a) at least two geophones adapted to convert seismic waves into output signals suitable for further processing;
   b) a positioning means for coupling the geophones to a wall of a borehole having an axis, said positioning means and said geophones being arranged such that in borehole seismic operations said geophones are coupled to said borehole wall at different locations lying in a plane essentially perpendicular to said borehole axis; and
   c) means for combining the output signals of the geophones such that noise due to wave energy guided along the borehole is suppressed.

2. The apparatus of claim 1, wherein in operation the geophones are positioned at essentially equal angular distances $\Delta\phi$ on the circumference of the borehole wall.

3. The apparatus of claim 2, wherein in operation the geophones are positioned at essentially equal angular distances $\Delta\phi$ equaling 180 degrees on the circumference of the borehole wall.

4. The apparatus of claim 2, wherein in operation the geophones are positioned at essentially equal angular distances $\Delta\phi$ equaling 90 degrees.

5. The apparatus of claim 1, further comprising repeating units of positioning means and geophones so as to position geophones at a plurality of positions in the borehole.

6. The apparatus of claim 1, wherein the geophones are responsive in one, two, or three linear independent directions.

7. The apparatus of claim 1 further comprising a means for attenuating acoustic energy traveling along the borehole and/or means for generating acoustic energy.

8. A method of seismic exploration of the strata adjacent to a borehole having an axis comprising the steps of:
   a) lowering at least two geophones into the borehole;
   b) coupling said geophones to a wall of said borehole at different locations lying approximately in a plane perpendicular to said borehole axis;
   c) using the geophones to convert seismic waves into output signals suitable for further processing; and
   d) combining the output signals of the geophones such that noise due to wave energy guided by the borehole is suppressed.

9. The method of claim 8, wherein the geophones are positioned at essentially equal angular distances on the circumference of the borehole.

10. The method of claim 9 wherein said distances are preferably 180 degrees or 90 degrees.

11. The method of claim 8, further comprising positioning groups of geophones in a plurality of planes within the borehole.

12. The method of claim 8 further comprising the step of activating a seismic source to generate acoustic energy which travels through the strata, using the geophones to detect acoustic energy, and transmitting an output of said geophones either unaltered or preprocessed to programmable means for data processing so as to produce a representation of said strata.

13. The method of claim 12 wherein the seismic source is located in a first borehole and the geophones are located in a second borehole.

14. A method of seismic exploration of an earth formation adjacent a borehole comprising the steps of:
   a) lowering at least two geophones into the borehole;
   b) coupling said geophones to a wall of said borehole, the geophones being located approximately in a plane perpendicular to said borehole;
   c) activating a seismic source to generate acoustic energy which travels through the earth formation;
   d) using the geophones to detect acoustic energy; and
   e) combining output signals of the geophones so as to suppress acoustic energy travelling by the borehole.

15. The method of claim 14 further comprising after step (d) the step of transmitting an output of said geophones either unaltered or preprocessed to programmable means for data processing so as to produce a representation of said earth formation.

16. A method in accordance with claim 15, wherein the seismic source is located in a first borehole and the geophones are located in a second borehole.

17. An apparatus according to claim 1 wherein noise due to wave energy guided along the borehole is suppressed to detect arrivals representing seismic waves that have undergone reflection from a reflector in a subterranean formation.

18. A method according to claim 8, wherein noise due to wave energy guided along the borehole is suppressed to detect arrivals representing seismic waves that have undergone reflection from a reflector in a subterranean formation.

* * * * *